United States Patent
Bisani et al.

(10) Patent No.: US 9,514,747 B1
(45) Date of Patent: Dec. 6, 2016

(54) REDUCING SPEECH RECOGNITION LATENCY

(71) Applicant: Amazon Technologies, Inc., Reno, NV (US)

(72) Inventors: Michael Maximilian Emanuel Bisani, Limburg (BE); Hugh Evan Secker-Walker, Newburyport, MA (US); Kenneth John Basye, Sutton, MA (US); Alexander David Rosen, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 14/011,898

(22) Filed: Aug. 28, 2013

(51) Int. Cl.
*G10L 21/00* (2013.01)
*G10L 25/93* (2013.01)
*G10L 15/00* (2013.01)
*G10L 15/26* (2006.01)
*G10L 17/00* (2013.01)
*G10L 15/04* (2013.01)
*G10L 25/00* (2013.01)
*G10L 15/22* (2006.01)

(52) U.S. Cl.
CPC .................................... *G10L 15/22* (2013.01)

(58) Field of Classification Search
CPC ....... G10L 15/00; G10L 15/04; G10L 15/22; G10L 15/08
USPC ........ 704/249, 246, 270, 240, 254, 244, 231
See application file for complete search history.

(56) References Cited

U.S. PATENT DOCUMENTS

| | | | | |
|---|---|---|---|---|
| 4,592,086 A * | 5/1986 | Watari | ................... | G10L 15/12 704/238 |
| 6,629,075 B1 * | 9/2003 | Schalkwyk | ................... | 704/270 |
| 6,728,677 B1 * | 4/2004 | Kannan et al. | ............... | 704/270 |
| 6,859,773 B2 * | 2/2005 | Breton | ................ | G10L 21/0208 704/226 |
| 7,720,683 B1 * | 5/2010 | Vermeulen et al. | .......... | 704/254 |
| 7,801,726 B2 * | 9/2010 | Ariu | ...................... | G06F 17/289 704/208 |
| 7,930,181 B1 * | 4/2011 | Goffin | ..................... | G10L 15/02 704/231 |
| 8,315,869 B2 * | 11/2012 | Harada | ........................... | 704/10 |
| 8,612,227 B2 * | 12/2013 | Kato | ....................... | G10L 15/08 704/251 |
| 9,064,495 B1 * | 6/2015 | Torok | .................. | H04L 43/0852 |

(Continued)

OTHER PUBLICATIONS

Pylkkonen. New pruning criteria for efficient decoding, 2005, In Proceedings of the 9th European Conference on Speech Communication and Technology, pp. 581-584, Lisbon, Portugal, Sep. 2005.*

*Primary Examiner* — Olujimi Adesanya
(74) *Attorney, Agent, or Firm* — Seyfarth Shaw LLP; Ilan N. Barzilay; Cyrus A. Miller

(57) ABSTRACT

In an automatic speech recognition (ASR) processing system, ASR processing may be configured to reduce a latency of returning speech results to a user. The latency may be determined by comparing a time stamp of an utterance in process to a current time. Latency may also be estimated based on an endpoint of the utterance or other considerations such as how difficult the utterance may be to process. To improve latency the ASR system may be configured to adjust various processing parameters, such as graph pruning factors, path weights, ASR models, etc. Latency checks and corrections may occur dynamically for a particular utterance while it is being processed, thus allowing the ASR system to adjust to rapidly changing latency conditions.

23 Claims, 11 Drawing Sheets

(56) References Cited

U.S. PATENT DOCUMENTS

| | | | |
|---|---|---|---|
| 9,070,367 B1* | 6/2015 | Hoffmeister | G10L 15/187 |
| 2003/0125945 A1* | 7/2003 | Doyle | 704/246 |
| 2005/0114118 A1* | 5/2005 | Peck | G10L 25/87 |
| | | | 704/208 |
| 2006/0190097 A1* | 8/2006 | Rubenstein | B60R 16/0373 |
| | | | 700/17 |
| 2007/0118363 A1* | 5/2007 | Sasaki | G10L 21/04 |
| | | | 704/214 |
| 2010/0004930 A1* | 1/2010 | Strope et al. | 704/240 |
| 2010/0094628 A1* | 4/2010 | Bacchiani | G10L 15/32 |
| | | | 704/235 |
| 2010/0312556 A1* | 12/2010 | Ljolje et al. | 704/244 |
| 2011/0071823 A1* | 3/2011 | Iwasawa | 704/231 |
| 2015/0281853 A1* | 10/2015 | Eisner | H04R 25/505 |
| | | | 381/312 |

* cited by examiner

REDUCING SPEECH RECOGNITION LATENCY

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data which may then be provided to various textual based programs and applications.

Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Automatic speech recognition (ASR) systems may be implemented in single devices or in a distributed computing system where local, typically lower power devices, are connected to remotely distributed, typically higher power devices, to perform ASR processing. Typically the local devices are nearest to users and take an audio input from the users. That audio input is then sent to the remote devices who process the audio into text and then send results back to the local device. The results may include text but may also include commands or other actions corresponding to the speech to perform on the local device. For example, a user may ask a local device to display the weather. The audio from the request may be processed by the remote device which may return to the local device some combination of text, commands and/or other information to display to the user in response to the weather request.

The multiple layers involved in ASR processing, whether in a distributed system or limited to a local device, may involve significant computing resources. As a result, a user may notice a delay between the time a spoken command is given to a device and the user sees any results. This delay may be referred to as end-to-end latency. Other delays, or latency, may also exist in the system. Latency may be the result of multiple factors, including the time for transporting data back and forth between a local device and a remote device, the time for pre-processing of a voice signal prior to actual speech recognition, the processing of the speech, the execution of a command based on the input speech, and other factors. To improve a user's experience it is desirable to reduce latency and to keep any user noticeable delays within an acceptable threshold or target latency. When latency goes above that acceptable threshold or target latency, an ASR system may implement techniques to more quickly process the user's speech and thus reduce latency.

Offered are a number of techniques to speed ASR processing when a speech processing system (including an ASR system and possible downstream processing) is suffering an undesirable latency. The techniques for speeding ASR processing discussed below may be combined with other latency reducing techniques, such as speeding networked communications between a local device and remote device, etc. In one aspect of the disclosure, a speech recognition system dynamically adjusts speech recognition configuration, such as pruning parameters, language models, acoustic models, and/or other factors to improve ASR processing speed.

Figure 1:
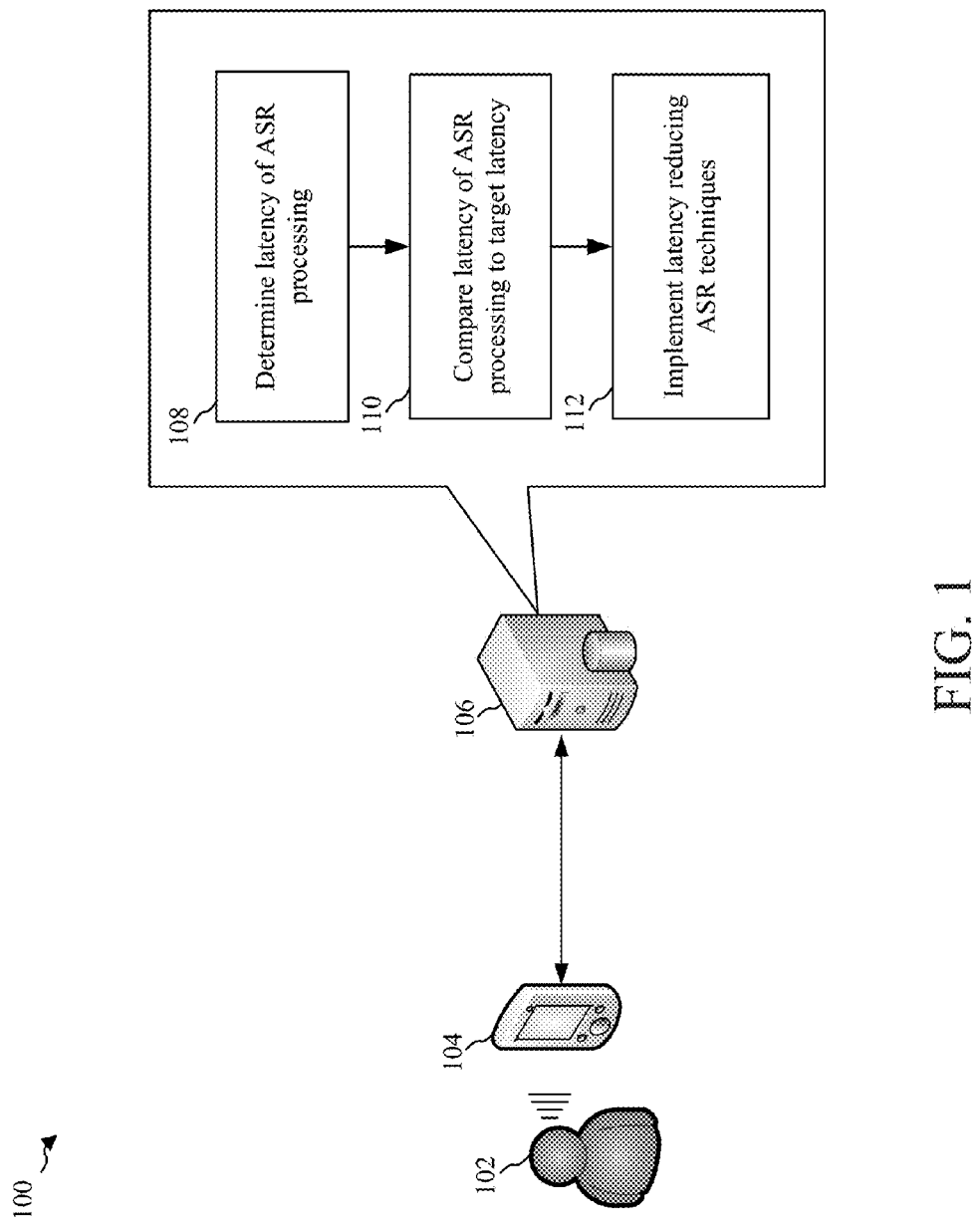
FIG. 1 illustrates one technique for reducing speech recognition latency according to one aspect of the present disclosure.

FIG. 1 illustrates a speech recognition system 100 for dynamically reducing latency of an ongoing utterance according to some aspects of the present disclosure. A local ASR device 104 receives a voice signal corresponding to a spoken utterance from a user 102 to facilitate speech recognition. In one aspect of the disclosure, the local ASR device 104 receives streaming audio content for ASR processing. The streaming audio content may comprise speech, music or other audio or voice signals. The local ASR device 104 sends the voice signal including the utterance or the streaming audio content to a remote ASR device 106. The remote ASR device 106 may be implemented in a remote device such as a remote server. The local ASR device 104 may be coupled to the remote ASR device 106 via a network. In some aspects of the disclosure, the ASR device 104 may stream the audio signal or voice signal to the remote ASR device 106. Thus, the ASR device processes the voice signal as the voice signal is being received.

At block 108, the remote ASR device 106 determines a latency of the ASR processing. The latency may include the time between when the user finishes speaking and when results are provided to the user. A number of techniques for determining latency are discussed below. The remote ASR device 106, may then determine, at block 110, whether the latency is beyond an acceptable target latency. When the latency is beyond the acceptable target latency, the remote ASR device 106 may implement latency reducing ASR techniques. The latency reducing techniques may be applied at the remote ASR device 106 and/or at the local ASR device 104. A detailed description of techniques for reducing ASR latency may be found below.

Figure 2:
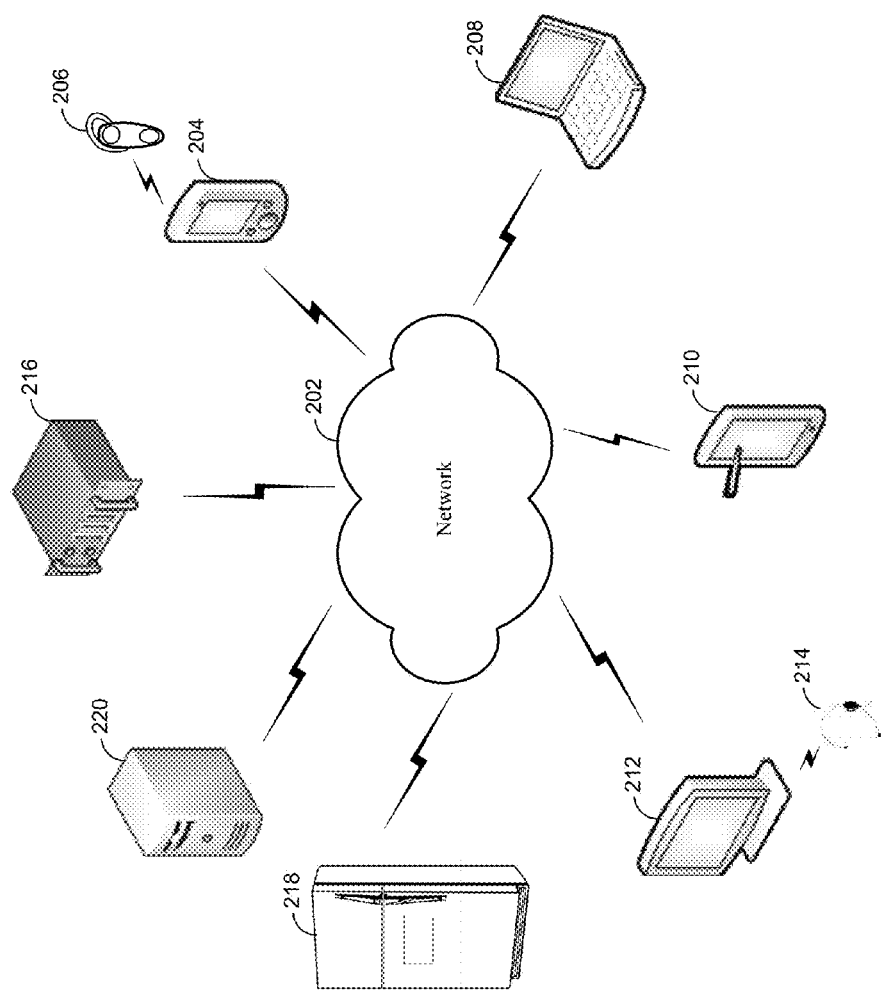
FIG. 2 illustrates a computer network for use with distributed speech recognition according to one aspect of the present disclosure.

Multiple ASR devices may be connected over a network. As shown in FIG. 2 multiple devices may be connected over network 202. Network 202 may include a local or private network or may include a wide network such as the internet. Devices may be connected to the network 202 through either wired or wireless connections. For example, a wireless device 204 may be connected to the network 202 through a wireless service provider. Other devices, such as computer 212, may connect to the network 202 through a wired connection. Other devices, such as home appliances like refrigerator 218, for example, located in a home or kiosks in a shopping establishment, etc., may connect to the network 202 through a wired or wireless connection. Other devices, such as laptop 208 or tablet computer 210 may be capable of connection to the network 202 using various connection methods including through a wireless service provider, over a WiFi connection, or the like. Networked devices may input spoken audio through a number of audio input devices including through headsets 206 or 214. Audio input devices may be connected to networked devices either through a wired or wireless connection. Networked devices may also include embedded audio input devices, such as an internal microphone (not pictured) in laptop 208, wireless device 204 or table computer 210.

In certain ASR system configurations, one device may capture an audio signal and another device may perform the ASR processing. For example, audio input to the headset 214 may be captured by computer 212 and sent over the network 202 to computer 220 or server 216 for processing. Or computer 212 may partially process the audio signal before sending it over the network 202. Because ASR processing may involve significant computational resources, in terms of both storage and processing power, such split configurations may be employed where the device capturing the audio has lower processing capabilities than a remote device and higher quality ASR results are desired. The audio capture may occur near a user and the captured audio signal sent to another device for processing.

Figure 3:
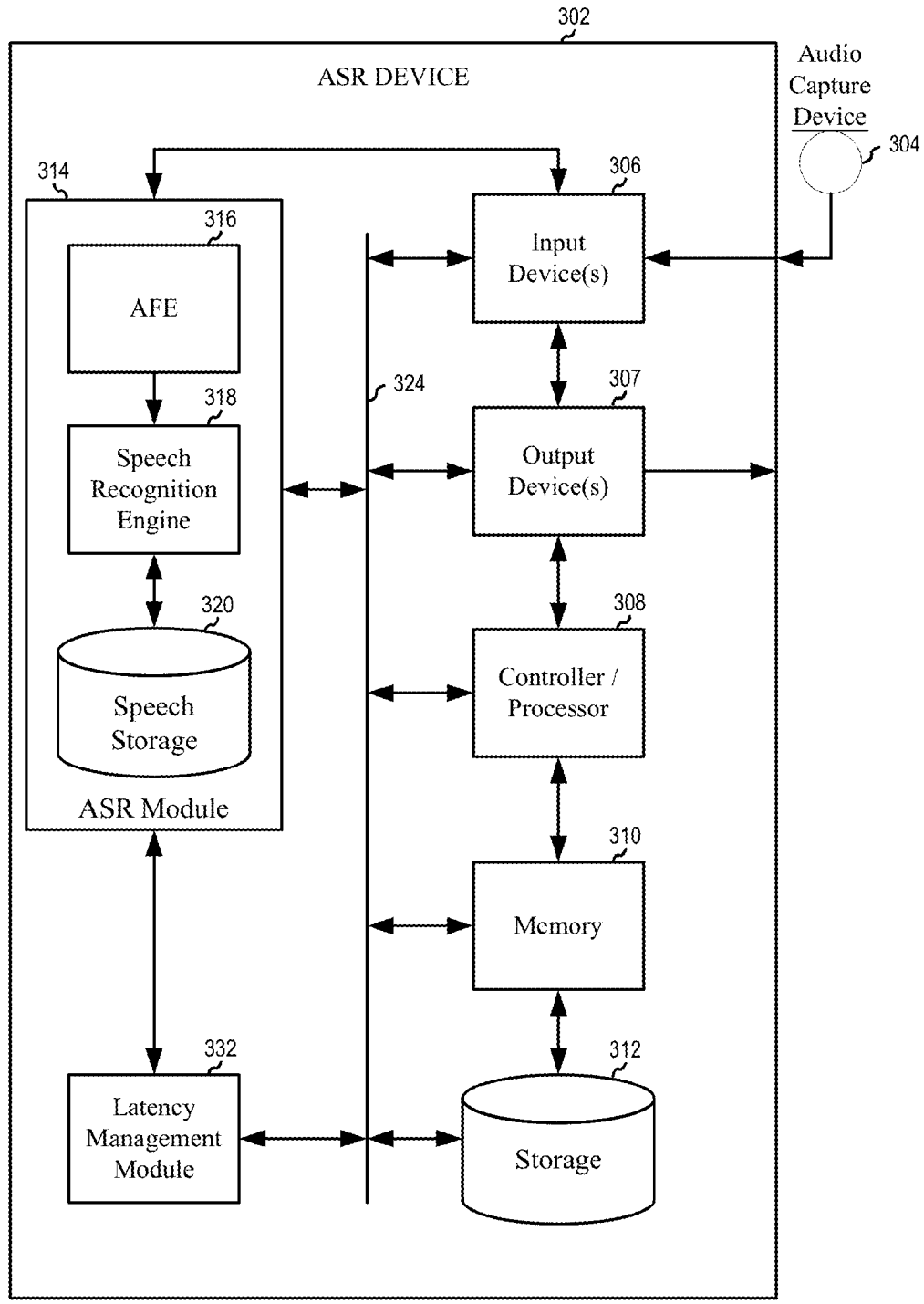
FIG. 3 is a block diagram conceptually illustrating a device for speech recognition according to one aspect of the present disclosure.

FIG. 3 shows an automatic speech recognition (ASR) device 302 for performing speech recognition. Aspects of the present disclosure include computer-readable and computer-executable instructions that may reside on the ASR device 302. FIG. 3 illustrates a number of components that may be included in the ASR device 302, however other non-illustrated components may also be included. Also, some of the illustrated components may not be present in every device capable of employing aspects of the present disclosure. Further, some components that are illustrated in the ASR device 302 as a single component may also appear multiple times in a single device. For example, the ASR device 302 may include multiple input devices 306, output devices 307 or multiple controllers/processors 308.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 3 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 302 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 3, the ASR device 302 may include an audio capture device 304 for capturing spoken utterances for processing. The audio capture device 304 may include a microphone or other suitable component for capturing sound. The audio capture device 304 may be integrated into the ASR device 302 or may be separate from the ASR device 302. The ASR device 302 may also include an address/data bus 324 for conveying data among components of the ASR device 302. Each component within the ASR device 302 may also be directly connected to other components in addition to (or instead of) being connected to other components across the bus 324. Although certain components are illustrated in FIG. 3 as directly connected, these connections are illustrative only and other components may be directly connected to each other (such as the ASR module 314 to the controller/processor 308).

The ASR device 302 may include a controller/processor 308 that may be a central processing unit (CPU) for processing data and computer-readable instructions and a memory 310 for storing data and instructions. The memory 310 may include volatile random access memory (RAM), non-volatile read only memory (ROM), and/or other types of memory. The ASR device 302 may also include a data storage component 312, for storing data and instructions. The data storage component 312 may include one or more storage types such as magnetic storage, optical storage, solid-state storage, etc. The ASR device 302 may also be connected to removable or external memory and/or storage (such as a removable memory card, memory key drive, networked storage, etc.) through the input device 306 or output device 307. Computer instructions for processing by the controller/processor 308 for operating the ASR device 302 and its various components may be executed by the controller/processor 308 and stored in the memory 310, storage 312, external device, or in memory/storage included in the ASR module 314 discussed below. Alternatively, some or all of the executable instructions may be embedded in hardware or firmware in addition to or instead of software. The teachings of this disclosure may be implemented in various combinations of software, firmware, and/or hardware, for example.

The ASR device 302 includes input device(s) 306 and output device(s) 307. A variety of input/output device(s) may be included in the device. Example input devices 306 include an audio capture device 304, such as a microphone (pictured as a separate component), a touch input device, keyboard, mouse, stylus or other input device. Example output devices 307 include a visual display, tactile display, audio speakers, headphones, printer or other output device. The input device 306 and/or output device 307 may also include an interface for an external peripheral device connection such as universal serial bus (USB), FireWire, Thunderbolt or other connection protocol. The input device 306 and/or output device 307 may also include a network connection such as an Ethernet port, modem, etc. The input device 306 and/or output device 307 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input device 306 and/or output device 307 the ASR device 302 may connect to a network, such as the Internet or private network, which may include a distributed computing environment.

The device may also include an ASR module 314 for processing spoken audio data into text. The ASR module 314 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 314 which then interprets the utterance based on the similarity between the utterance and models known to the ASR module 314. For example, the ASR module 314 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language model or grammar). Based on the considered factors and the assigned recognition score, the ASR module 314 may output the most likely words recognized in the audio data. The ASR module 314 may also output multiple alternative recognized words in the form of a lattice or an N-best list (described in more detail below).

While a recognition score may represent a probability that a portion of audio data corresponds to a particular phoneme or word, the recognition score may also incorporate other information which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, etc.

The ASR module 314 may be connected to the bus 324, input device(s) 306 and/or output device(s) 307, audio capture device 304, encoder/decoder 322, controller/processor 308 and/or other component of the ASR device 302. Audio data sent to the ASR module 314 may come from the audio capture device 304 or may be received by the input device 306, such as audio data captured by a remote entity and sent to the ASR device 302 over a network. Audio data may be in the form of a digitized representation of an audio waveform of spoken utterances. The sampling rate, filtering, and other aspects of the analog-to-digital conversion process may impact the overall quality of the audio data. Various settings of the audio capture device 304 and input device 306 may be configured to adjust the audio data based on traditional tradeoffs of quality versus data size or other considerations.

The ASR module 314 includes an acoustic front end (AFE) 316, a speech recognition engine 318, and speech storage 320. The AFE 316 transforms audio data into data for processing by the speech recognition engine 318. The speech recognition engine 318 compares the speech recognition data with the acoustic, language, and other data models and information stored in the speech storage 320 for recognizing the speech contained in the original audio data. The AFE 316 and speech recognition engine 318 may include their own controller(s)/processor(s) and memory or they may use the controller/processor 308 and memory 310 of the ASR device 302, for example. Similarly, the instructions for operating the AFE 316 and speech recognition engine 318 may be located within the ASR module 314, within the memory 310 and/or storage 312 of the ASR device 302, or within an external device.

Figure 4:
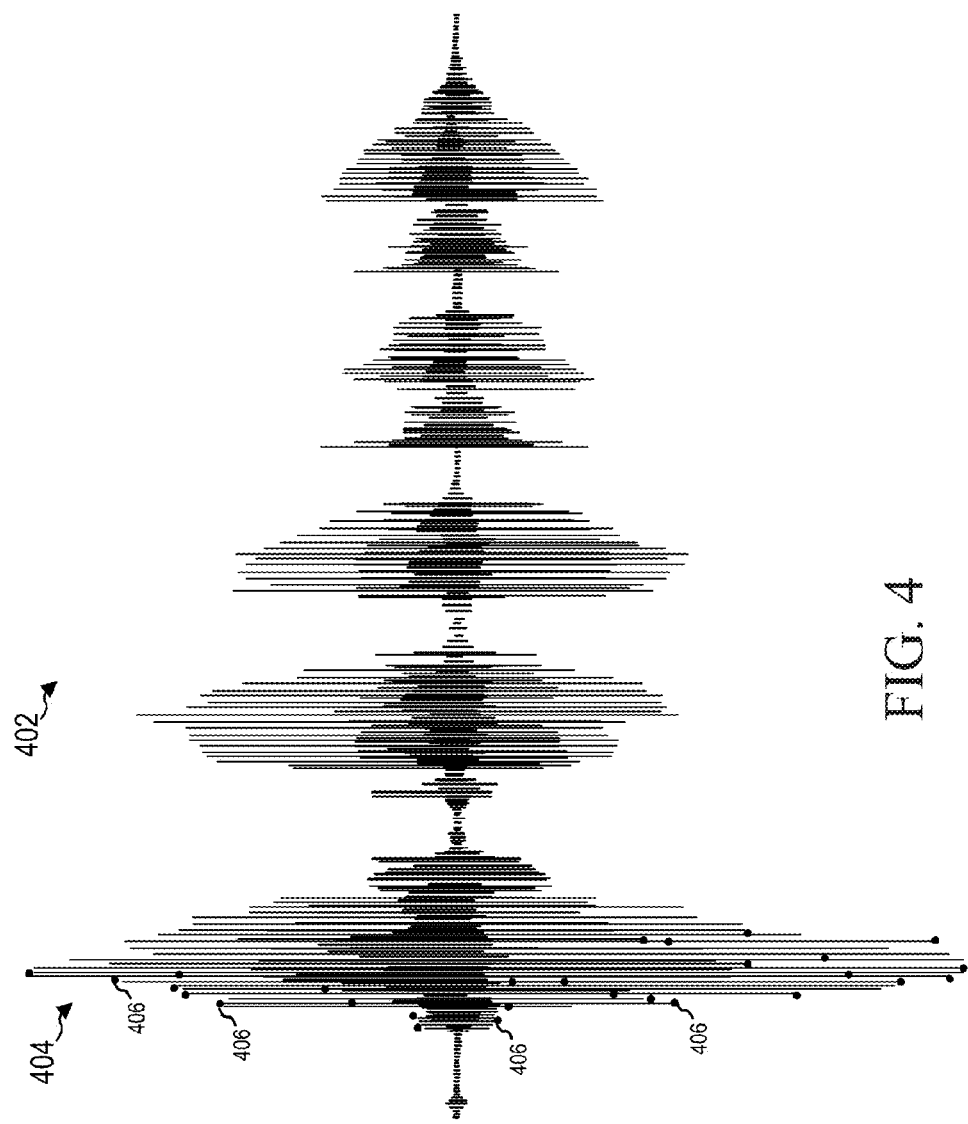
FIG. 4 illustrates an audio waveform processed according to one aspect of the present disclosure.

Received audio data may be sent to the AFE 316 for processing. The AFE 316 may reduce noise in the audio data, identify parts of the audio data containing speech for processing, and segment or portion and process the identified speech components. The AFE 316 may divide the digitized audio data into frames or audio segments, with each frame representing a time interval, for example 10 milliseconds (ms). During that frame the AFE 316 determines a set of values, called a feature vector, representing the features/qualities of the utterance portion within the frame. Feature vectors may contain a varying number of values, for example forty. The feature vector may represent different qualities of the audio data within the frame. FIG. 4 shows a digitized audio data waveform 402, with multiple points 406 of the first word 404 as the first word 404 is being processed. The audio qualities of those points may be stored into feature vectors. Feature vectors may be streamed or combined into a matrix that represents a time period of the spoken utterance. These feature vector matrices may then be passed to the speech recognition engine 318 for processing. A number of approaches may be used by the AFE 316 to process the audio data. Such approaches may include using mel-frequency cepstral coefficients (MFCCs), perceptual linear predictive (PLP) techniques, neural network feature vector techniques, linear discriminant analysis, semi-tied covariance matrices, deep belief networks or other approaches known to those of skill in the art.

Processed feature vectors may be output from the ASR module 314 and sent to the output device 407 for transmission to another device for further processing. The feature vectors may be encoded and/or compressed by the encoder/decoder 322 prior to transmission. The encoder/decoder 322 may be customized for encoding and decoding ASR data, such as digitized audio data, feature vectors, etc. The encoder/decoder 322 may also encode non-ASR data of the ASR device 302, for example using a general encoding scheme such as .zip, etc. The functionality of the encoder/decoder 322 may be located in a separate component, as illustrated in FIG. 3, or may be executed by the controller/processor 308, ASR module 314, or other component, for example.

The speech recognition engine 318 may process the output from the AFE 316 with reference to information stored in the speech storage 320. Alternatively, post front-end processed data (such as feature vectors) may be received by the ASR module 314 from another source besides the internal AFE 316. For example, another entity may process audio data into feature vectors and transmit that information to the ASR device 302 through the input device(s) 306. Feature vectors may arrive at the ASR device 302 encoded, in which case they may be decoded (for example by the encoder/decoder 322) prior to processing by the speech recognition engine 318.

The speech storage 320 includes a variety of information for speech recognition such as data matching pronunciations of phonemes to particular words. This data may be referred to as an acoustic model. The speech storage may also include a dictionary of words or a lexicon. The speech storage may also include data describing words that are likely to be used together in particular contexts. This data may be referred to as a language or grammar model. The speech storage 320 may also include a training corpus that may include recorded speech and/or corresponding transcription, that may be used to train and improve the models used by the ASR module 314 in speech recognition. The training corpus may be used to train the speech recognition models, including the acoustic models and language models, in advance. The models may then be used during ASR processing.

The training corpus may include a number of sample utterances with associated feature vectors and associated correct text that may be used to create, for example, acoustic models and language models. The sample utterances may be used to create mathematical models corresponding to expected audio for particular speech units. Those speech units may include a phoneme, syllable, part of a syllable, word, etc. The speech unit may also include a phoneme in context such as a triphone, quinphone, etc. Phonemes in context used regularly in speech may be associated with their own models. Phonemes in context that are less common may be clustered together to have a group model. By clustering phoneme groups in this manner, fewer models may be included in the training corpus, thus easing ASR processing. The training corpus may include multiple versions of the same utterance from different speakers to provide different utterance comparisons for the ASR module 314. The training corpus may also include correctly recognized utterances as well as incorrectly recognized utterances. These incorrectly recognized utterances may include grammar errors, false recognition errors, noise, or other errors that provide the ASR module 314 with examples of error types and corresponding corrections, for example.

Other information may also be stored in the speech storage 320 for use in speech recognition. The contents of the speech storage 320 may be prepared for general ASR use or may be customized to include sounds and words that are likely to be used in a particular application. For example, for ASR processing at an ATM (automated teller machine), the speech storage 320 may include customized data specific to banking transactions. In certain instances the speech storage 320 may be customized for an individual user based on his/her individualized speech input. To improve performance, the ASR module 314 may revise/update the contents of the speech storage 320 based on feedback of the results of ASR processing, thus enabling the ASR module 314 to improve speech recognition beyond the capabilities provided in the training corpus.

The speech recognition engine 318 attempts to match received feature vectors to words or subword units as known in the speech storage 320. A subword unit may be a phoneme, phoneme in context, syllable, part of a syllable, syllable in context, or any other such portion of a word. The speech recognition engine 318 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The speech recognition engine 318 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 318, the state may change or stay the same, based on the processing of the new feature vectors. A Viterbi algorithm may be used to find the most likely sequence of states based on the processed feature vectors.

Figure 5:
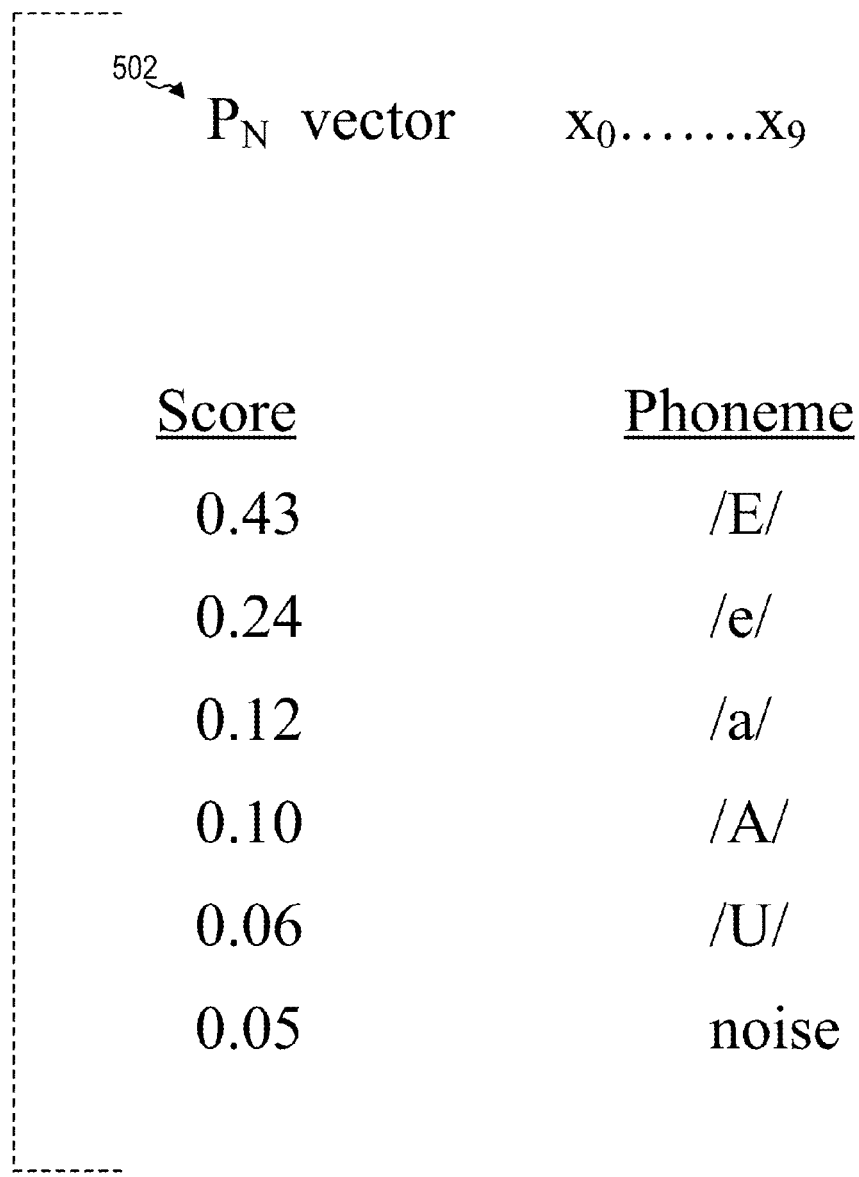
FIG. 5 illustrates phoneme processing according to one aspect of the present disclosure.

In one example, the speech recognition engine 318 may receive a series of feature vectors for sound corresponding to a user saying "Hello, how are you today?" The speech recognition engine 318 may attempt to match each feature vector with a phoneme in the speech recognition database 320. For example, FIG. 5 shows a series of feature vectors 502 corresponding to phoneme $P_N$ (representing the "e" sound in "hello"), including ten feature vectors $X_0$ through $X_9$. Upon processing of the first feature vector, the speech recognition engine 318 makes a preliminary determination as to the probability that the feature vector matches a phoneme, shown as the score in FIG. 5. Based on the feature vector, the phoneme /E/ may be assigned an initial score of 0.43, phoneme /e/ (a different pronunciation from /E/) may be assigned a score of 0.24, etc. The score may be based on how closely the feature vector matches a distribution associated with a phoneme state within one or more acoustic models stored in the speech storage 320. A feature vector may also be assigned a score that the feature vector represents noise or silence. In the example of FIG. 5, the score that the feature vector represents noise is 0.05.

Figure 6:
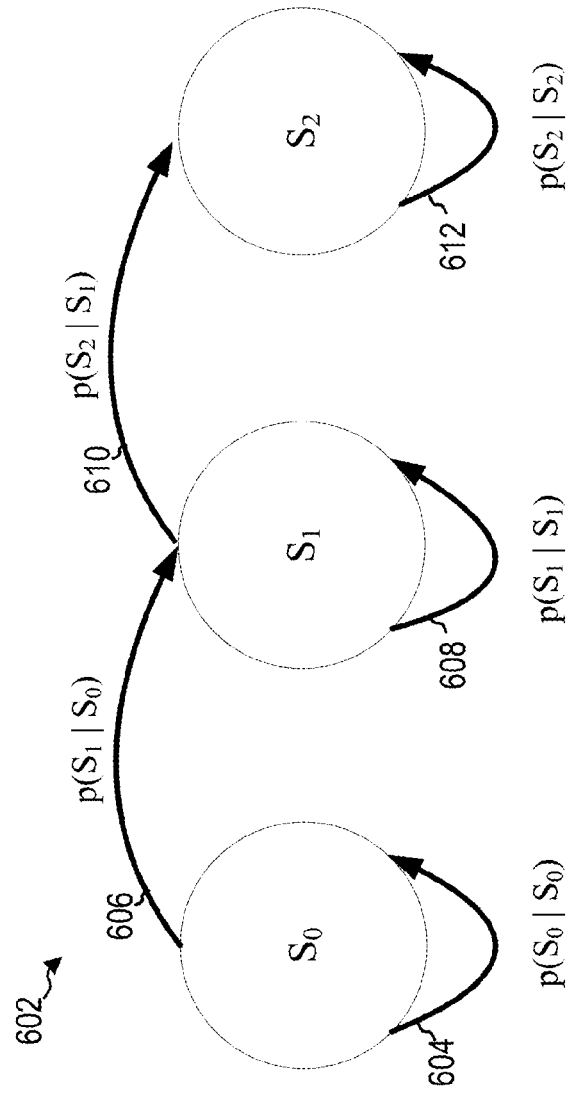
FIG. 6 illustrates phoneme processing in a Hidden Markov Model according to one aspect of the present disclosure.

Taking the example of the feature vector with a score of 0.43 for the phoneme /E/ shown in FIG. 5, the speech recognition engine 318 initially assigns a score of 0.43 that the feature vector matches the first state of the phoneme /E/, shown as state $S_0$ in the Hidden Markov Model illustrated in FIG. 6. After further processing, the speech recognition engine 318 determines whether the state should either remain the same, or change to a new state. For example, whether the state should remain the same 604 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent frames, the speech recognition engine 318 similarly determines whether the state should remain at $S_1$, using the transition probability represented by $P(S_1|S_1)$ 608, or move to the next state, using the transition probability $P(S_2|S_1)$ 610. As the processing continues, the speech recognition engine 318 continues calculating such probabilities including the probability 612 of remaining in state $S_2$ or the probability of moving from a state of illustrated phoneme /E/ to a state of another phoneme. After processing the feature vectors for state $S_2$, the speech recognition may move to the next phoneme in the utterance.

The probabilities and states may be calculated using a number of techniques. For example, probabilities for each state may be calculated using a Gaussian model, Gaussian mixture model, or other technique based on the feature vectors and the contents of the speech storage 320. Techniques such as maximum likelihood estimation (MLE) may be used to estimate the probability of phoneme states.

In addition to calculating potential states for one phoneme as a potential match to a feature vector, the speech recognition engine 318 may also calculate potential states for other phonemes, such as phoneme /e/ and/or phoneme /a/ for the example shown in FIG. 5 as potential matches for the feature vector. In this manner multiple states and state transition probabilities may be calculated.

The probable states and probable state transitions calculated by the speech recognition engine 318 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The speech recognition engine 318 may also compute scores of branches of the paths based on language models or grammars. Language modeling involves determining scores for what words are likely to be used together to form coherent words and sentences. Application of a language model may improve the likelihood that the ASR module 314 correctly interprets the speech contained in the audio data. For example, acoustic model processing returning the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance. The language modeling may be determined from a training corpus stored in the speech storage 320 and may be customized for particular applications.

Figure 7:
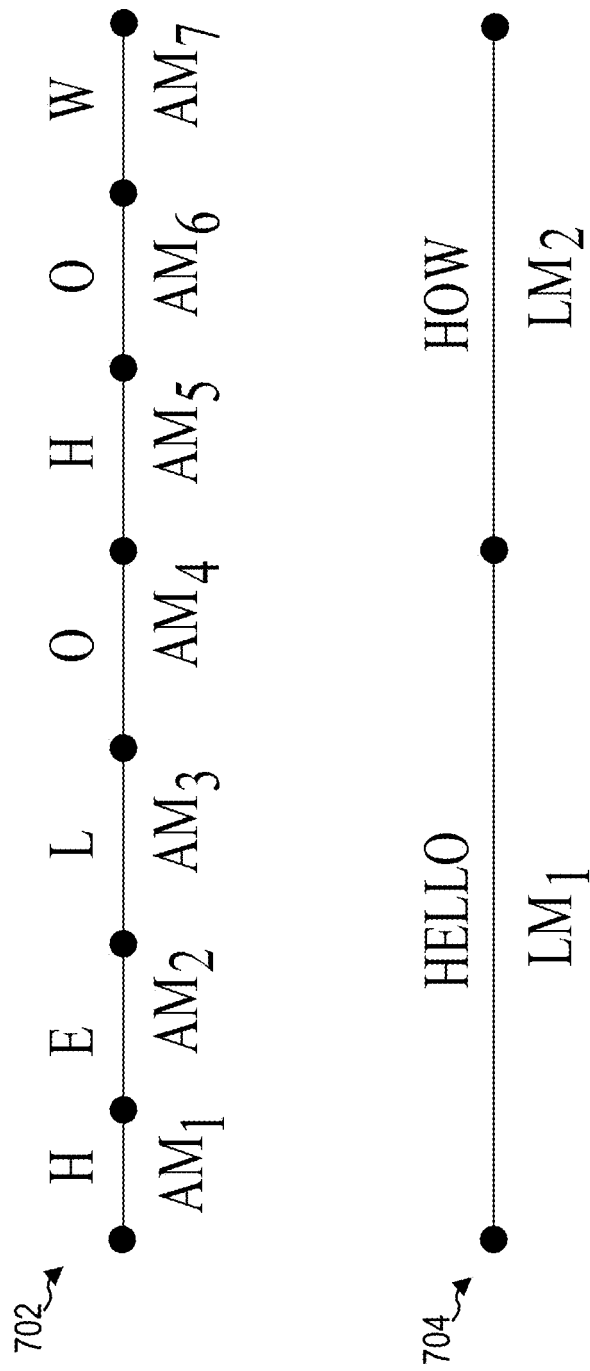
FIG. 7 illustrates phoneme processing and word processing according to one aspect of the present disclosure.

FIG. 7 illustrates the relationship between acoustic modeling and language modeling. As illustrated, each processed phoneme included in the path 702 is associated with an acoustic model score $AM_1$ through $AM_7$. The language model is then applied to associate each word in the path 704 with a language model score $LM_1$ or $LM_2$.

Figure 8:
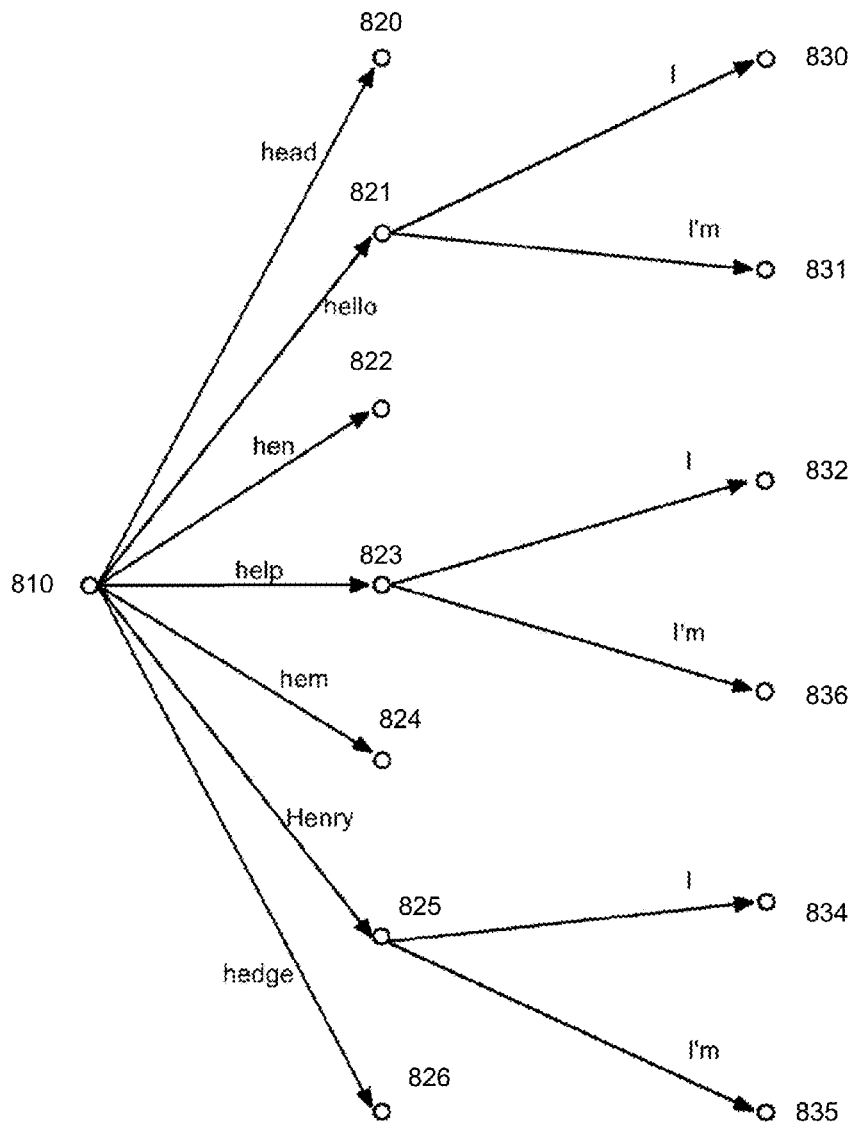
FIG. 8 illustrates a word result network according to one aspect of the present disclosure.

As part of the language modeling (or in other phases of the ASR processing) the speech recognition engine 318 may, to save computational resources, prune and discard low recognition score states or paths that have little likelihood of corresponding to the spoken utterance, either due to low recognition score pursuant to the language model, or for other reasons. Further, during the ASR processing the speech recognition engine 318 may iteratively perform additional processing passes on previously processed utterance portions. Later passes may incorporate results of earlier passes to refine and improve results. As the speech recognition engine 318 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 8 shows an example of a word result network that may be used by a speech recognition engine 318 for recognizing speech according to some aspects of the present disclosure. A word result network may consist of sequences of words that may be recognized and the likelihood of each sequence. The likelihood of any path in the word result network may be determined by an acoustic model and a language model. In FIG. 8, the paths shown include, for example, "head", "hello I", "hello I'm", "hen", "help I", "help I'm", "hem", "Henry I", "Henry I'm", and "hedge".

As illustrated in FIG. 8, a word result network may start at initial node 810. At node 810, no words may have been recognized yet as the speech recognition engine 318 commences its processing. From node 810, the speech recognition engine 318 may create arcs and additional nodes where each arc may be associated with a potential word that may be recognized. In some applications, words may be represented by nodes instead of arcs. In FIG. 8, arcs from node 810 to nodes 820 to 826 are labeled with example words that may be recognized by the speech recognition engine 318.

From initial node 810, the speech recognition engine 318 may apply acoustic and language models to determine which of the arcs leaving node 810 are most likely to occur. For an acoustic model employing HMMs, speech recognition engine 318 may create a separate HMM for each arc leaving node 810. Applying the acoustic and language models the speech recognition engine 318 may decide to pursue some subset of the arcs leaving node 810. For example, in FIG. 8, the speech recognition engine 318 may decide to follow the paths starting with "hello", "help", and "Henry" and may decide to stop pursuing the paths starting with "head", "hen", and "hedge" based on the respective scores of those arc, with the speech recognition engine 318 pursuing only the higher scoring arcs in an effort to concentrate computing resources on the arcs most likely to result in a correct result.

The speech recognition engine 318 may return an N-best list of paths along with their respective recognition scores, corresponding to the top N paths as determined by the speech recognition engine 318. An application (such as a program or component either internal or external to the ASR device 302) that receives the N-best list may then perform further operations or analysis on the list given the list and the associated recognition scores. For example, the N-best list may be used in correcting errors and training various options and processing conditions of the ASR module 314. The speech recognition engine 318 may compare the actual correct utterance with the best result and with other results on the N-best list to determine why incorrect recognitions received certain recognition scores. The speech recognition engine 318 may correct its approach (and may update information in the speech storage 320) to reduce the recognition scores of incorrect approaches in future processing attempts.

In one aspect of the disclosure, the speech recognition engine 318 may use a finite state transducer (FST) instead of a word result network. An FST is a graph that may include all possible words that may be recognized by the speech recognition engine 318. While the word result network of FIG. 8 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 8. The word result network of FIG. 8 may be built out to include all possible utterances that could be recognized by an engine. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be creating by composing other FSTs. For example, an FST that includes words and phones may be created by composing an FST of words with an FST of phones.

Figure 9:
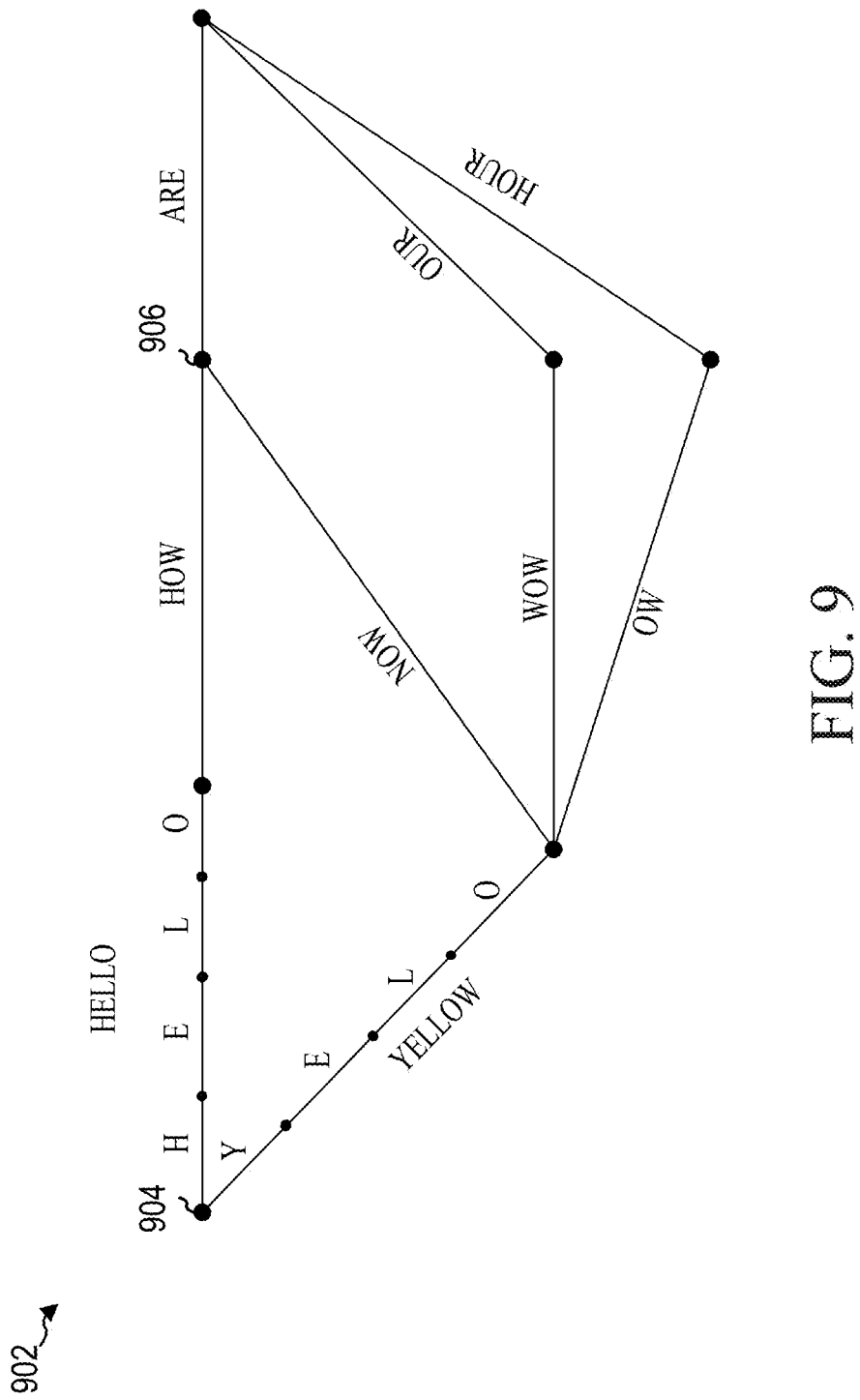
FIG. 9 illustrates a speech recognition lattice according to one aspect of the present disclosure.

The speech recognition engine 318 may combine potential paths into a lattice representing speech recognition results. A sample lattice is shown in FIG. 9. The lattice 902 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 904 and node 906 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 318 as the ASR result for the associated feature vectors. Following ASR processing, the ASR results may be sent by the ASR module 314 to another component of the ASR device 302, such as the controller/processor 308 for further processing (such as execution of a command included in the interpreted text) or to the output device 307 for sending to an external device.

The entire speech processing timeline, from initial receipt of the user's spoken command, to eventual execution of that command as noticed by the user may take a significant amount of computing resources and time to complete. If the amount of time between when a user finishes speaking and results are delivered to the user, called latency, exceeds a certain target latency, it may be noticeable and likely distracting to a user. Latency of ASR processing may be caused by a number of factors, such as sudden load spikes on an ASR server (which may result in fewer computing resources being available to processes ASR tasks), unclear or confusing speech input (which may increase processing time due to many hypotheses scoring poorly, including, in some instances, the best hypotheses), delays introduced when the voice signal is transmitted to the remote speech recognition device, etc. From a system perspective, it is generally desirable to reduce any user noticeable latency, and in certain circumstances may be desirable to reduce latency even if improved speed comes at the cost of reduced quality ASR results.

Offered, is speech recognition system and method to reduce the latency between the submission of an utterance to the system by the user and the delivery of the beginning of a response to the user from the speech recognition system. To manage ASR latency one or more ASR devices may include a latency management module 332 as shown in FIG. 3. The latency management module 332 may monitor latency as disclosed below and take action to adjust ASR processing, also as described below, to reduce latency that may be the result of ASR processing. While latency reduction techniques may take many forms, this disclosure is focused on techniques that may be implemented as part of the ASR/speech processing process. The techniques described here may also be combined with other techniques, such as network improvement techniques, application improvement techniques, etc.

Latency may be measured in a number of ways. Described below are a number of different techniques that may either be used alone or in various combinations. A determination of latency may be made by a local device and/or a remote device and may be communicated between the two. End-to-end latency measures a time from when a user speaks a command to a local device and the local device returns a result. End-to-end latency may be measured by recording a time (sometimes called a time-stamp) of when a user completes inputting audio, recording a time when a result is returned to the user, and determining the difference between those times. The end-to-end latency may also be broken up into different portions to measure partial latencies along the complete speech processing system. For example, an ASR system may measure how long a request has been pending by comparing the utterance time-stamp (that is, the time-stamp indicating when an utterance was input to a local device) to a current time during ASR processing. The utterance time-stamp may be configured to either indicate the beginning of the entering of the utterance, the time the user completed the utterance and/or any time in between. In certain circumstances, as determining the end of the utterance may be non-trivial, an utterance may be time stamped at a beginning and its length determined by an end-pointing procedure combined with counting frames of the utterance from the beginning to the end. In situations where the time of a local device (which may create the utterance time-stamp) does not precisely match the time of a remote device (which may be measuring the current time) an offset between the clocks of the local device and remote device may be determined and used in the latency calculations. Thus the ASR system may determine how long an ASR request has been pending by comparing the utterance-time stamp to the current time in addition to any offset. Techniques for determining the offset and determining latency are described in U.S. patent application Ser. No. 13/889,277, filed on May 7, 2013 in the names of Torok, et al. entitled "MEASUREMENT OF USER PERCEIVED LATENCY IN A CLOUD BASED SPEECH APPLICATION", the disclosure of which is hereby incorporated by reference in its entirety.

The ASR system may also measure a current ASR processing rate to determine if ASR processing is proceeding at a desirable pace to reduce latency. If not, the ASR system may implement adjusted processing to reduce latency. In one aspect of the present disclosure, the ASR system measures its processing rate by tracking how many frames per second (or other unit of time) the ASR system is able to process. If this rate of processing frames falls below a desirable rate, latency reducing measures may be implemented. The rate of frame processing may be measured by the AFE 316, the speech recognition engine 318, or other component.

The ASR system may also determine how much of a particular utterance remains to be processed and use that information to determine whether to implement latency reducing measures. To determine the backlog of a particular utterance the system may determine an endpoint of the utterance through traditional methods using the speech recognition engine 318, however traditional methods may not identify the endpoint sufficiently in advance to adjust ASR processing quickly enough to have a meaningful impact on latency.

Thus, in some aspects of the disclosure, the ASR system may implement a lookahead decoder which is configured specifically to identify an endpoint of an incoming ASR utterance prior to traditional ASR processing. Thus the lookahead decoder (which may be implemented by the speech recognition engine 318 or some other component) may perform limited preliminary processing on an ASR input for the limited purpose of identifying the endpoint of the utterance (a process called endpointing). The lookahead decoder may be trained and configured specifically for the purposes of endpointing. Because the lookahead decoder is configured for a limited purpose, it may process incoming audio faster than a primary speech decoder performing full ASR processing. Further, this lookahead feature allows for improvements in delivery of the audio in contrast to traditional ASR processing as the lookahead features provides additional diagnostics of incoming audio, and allows for improved processing. Thus the endpoint of an utterance may be identified earlier than primary speech decoding, thus allowing the ASR system to determine how much of an utterance remains to be processed.

In some aspects, the fast lookahead decoder may be implemented at the front end of the speech recognition device, such that the fast lookahead decoder is among the first components in the speech recognition system to receive and process the voice signal. This feature allows the end point of the utterance to be determined in advance and frees up processing resources of the main decoder. In a distributed system, for example, the local user device, which may be the earliest device that processes the voice signal, may be configured to determine the endpoint of the utterance or to initiate processes to determine the endpoint of the utterance. The endpoint configured device (be that the user device or some other device that is equipped with the lookahead decoder) may provide the results of the endpoint determination process to the ASR processing device, which may be a remote device connected over a network.

Based on the determined endpoint, the ASR system may determine the amount of utterance remaining. If the ASR system determines that the portion of an utterance remaining is too long or requires excessive processing to satisfy latency metrics, the ASR system may implement latency reducing techniques. The measurement of the utterance remaining may also be combined with other measurements, such as the rate of ASR processing, to estimate how long the utterance will take to process and whether latency metrics are likely to be met given the speed of processing and the amount of the utterance remaining. Further, knowing how much utterance remains (and the estimated processing time remaining) will allow the ASR to tailor its latency improvement techniques (such as weight selection, a pruning parameter, numerical-precision parameter, Gaussian mixture-component-count parameter, frame-rate parameter, score-caching parameter, intent-difficulty parameter, user-class parameter, audio-quality parameter, server-load parameter and/or other items) specifically to the utterance and tailoring such techniques to just meet latency metrics without sacrificing results quality unnecessarily.

In addition to measuring current latency, the ASR system may predict latency based on qualities of the incoming audio. If the incoming audio is such that latency is likely to be experienced during forthcoming ASR processing, the ASR system may implement latency reducing techniques ahead of time (even if the latency is not presently at an undesired level) so that the ASR can avoid an expected overall utterance latency. To estimate latency the ASR system may employ a number of techniques. One technique is to analyze/predict the load on an ASR server and to reduce latency before the server experiences a high load. Another technique is to analyze the incoming audio to determine whether it is likely to cause high latency, such as being difficult to process, including high levels of noise, etc. Similar to the lookahead implementation for end point determination, the ASR system may implement techniques such as a lookahead component to determine the quality of the incoming voice signal. For example, the quality determination may be implemented at a classifier device instead of the main decoder to facilitate the speech processing and to free up resources at the main decoder. The classifier may be disposed or implemented in a similar configuration as the lookahead decoder. The classifier may determine in advance whether the portions of the utterance are confusing based on the quality of the voice signal and to determine in advance the number of frames or audio segments/portions of the voice signal that are confusing. For example, the utterance portion may be indicated as clean when one or two potential corresponding speech units have a higher likelihood than the remainder of the speech units, thus indicating audio that is relatively free of noise and easy to process. In some aspects of the disclosure, the speech recognition system may implement latency reducing techniques on current clean frames (i.e., frames that are not confusing) to make up for the anticipated slow processing or anticipated inaccurate processing typically associated with the confusing frames.

To reduce latency in ASR processing, a number of techniques may be implemented either alone or in combination. As processing a lattice, word network or other graph, along with the corresponding probabilities is one of the most computationally intensive (and time intensive) techniques of ASR processing, adjustments to this processing may be implemented when latency improvements are desired. As noted, ASR systems process speech input by forming partial hypotheses about the spoken word sequence and gradually extend these hypotheses as more audio data or speech is received from the user. Since the space of possible hypotheses is extremely large, pruning strategies are employed to discard the less likely hypotheses. Pruning strategies may be based on the scores assigned to particular arcs in a word network or other graph. In one aspect, the ASR system may configure (or reconfigure) a threshold of a number of possible paths or partial paths to be considered during ASR processing. A partial path may correspond to portions of an audio input representing an utterance. Although, the following discussion describes a path, the description also applies to a partial path. The ASR system may determine that it will only consider the highest scoring P paths and will discard the rest. The value of P may be adjusted based on the latency, with P becoming smaller with greater latency, thus allowing the ASR system to process results faster due to the need to consider fewer paths. In another aspect, the ASR system may configure (or reconfigure) a threshold score where the ASR system will only consider arcs above that score during ASR processing. Thus, the ASR system may determine that it will only consider the highest scoring S paths and will discard the rest. The value of S may also be adjusted based on the latency, with S becoming higher with greater latency, thus allowing the ASR system to process results faster due to the need to consider fewer low scoring paths. As may be appreciated, if the ASR system considers fewer paths the accuracy of ASR results may suffer. By dynamically adjusting the pruning parameters, the ASR system may dynamically control the tradeoff between accuracy and processing speed of an utterance to ensure latency is reduced while maintaining certain desired quality metrics as well.

In one aspect of the disclosure, pruning parameters may be applied to the recognition scores of the features of the of the ASR techniques to limit the number of arcs and nodes that may be created. Applying pruning parameters to the recognition features may entail assigning weights to the features of the ASR techniques. The weights may cause the recognition scores of certain features to worse or better. The weights may be dynamically adjusted during an ongoing utterance by increasing or decreasing the weights to vary the recognition scores of the features. The dynamic adjustment of the recognition scores of the features of the ASR techniques may cause certain features of the ASR techniques to meet or fail to meet a threshold recognition score value and are therefore eliminated or incorporated into the graph based on the adjustment. In some aspects of the disclosure, the threshold recognition score may be dynamically adjusted based on whether the speech recognition system is currently subjected to latency pressure.

In another aspect, in the presence of undesired latency, certain paths or portions of a graph may be weighted to make those paths higher or lower scoring to speed up ASR processing. Certain regions of a graph may be tagged with different identifiers so that under certain conditions the scores associated with portions of the graph may be adjusted. Multiple different tags may be used to make the system more configurable and adjustable to respond to different latency/utterance conditions. In this manner the ASR processing may be more finely tuned than with the pruning techniques described above. If certain portions of the graph may take longer to process or are computationally expensive but should not be discarded entirely, those portions may be weighted lower under high latency conditions. Or, if those portions should be discarded, their weights may be set to zero. In some aspects, some arcs may be tagged based on 'obscurity' measures to avoid those arcs when the speech recognition system is subjected to latency pressure. Similarly, if other portions of the graph are less computationally expensive, etc., those portions may be weighted higher under high latency conditions in an attempt to have the ASR system focus its processing more heavily on the most likely paths. These adjustable weights may be set for different words, word patterns, or any other configuration based on desired tuning and/or empirical experimentation for how well the weighting reduces latency. The weights may also be configured/adjusted based on the specific user who spoke the utterance, particular audio conditions, etc. For example, words that are commonly spoken by the user may receive higher weights than words rarely spoken by the particular user.

In one aspect of the disclosure, to speed up ASR processing the ASR system may disregard certain acoustic factors for a particular incoming frame of audio. That is the feature vector associated with the incoming frame may not be populated with each potential feature to allow for faster processing of the feature vectors, and thus the entire utterance. The features which may be omitted may be selected dynamically based on the incoming audio of the utterance, as well as based on previous experimentation, to determine which features may be ignored without the quality of results suffering too greatly. The acoustic features may be ranked based on their accuracy or a likelihood that the acoustic features contribute to a correct pathway along the decoder graph. The processing of certain features of the acoustic model may be dynamically adjusted based on a desire to speed up or slow down the speech recognition process. For example, performance of the acoustic model may be adjusted to reduce the latency of the speech recognition system by assigning weights to the features.

In some aspects of the disclosure, the models (e.g., acoustic model, language model or grammar) or features of the models are selected based on a user's tendency for latency or pattern of use of the speech recognition system. For example, a faster but less accurate model may be selected if the user tends to be subjected to an undesirable latency for his/her utterances. Further, paths on the graph may be weighted as described above based on the parts of the graph that the user tends to use. Furthermore, multiple users with similar behavior, may be clustered together and the weights for the paths, or other ASR parameters, for the clustered users are selected based on the behavior of the clustered users. For example, the cluster of users may have similar musical taste (e.g., classical music), and may therefore use similar search terms or words when selecting music to play. As a result, their utterance may be processed at similar parts of the network or may follow similar pathway along the graph. In contrast, a user with an interest in pop music may use different words than those associated with classical music and may therefore use a different part of the network.

The cluster of users interested in classical music, for example, may be grouped as classical music lovers' and weights may be assigned to graph portions frequently used (or avoided) by the group of users. The weights may be assigned such that it is harder for utterances of the tagged users to use parts of the network associated with other forms of music, such as pop music. Thus, the word network or graph may be trimmed based on the behavioral pattern of a user or a cluster of users with the similar behavioral patterns.

In one aspect of the present disclosure, the latency reducing techniques are adjustable in view of computer resources available to the speech recognition system. The computer resources may include resources shared resources, such as a central processing unit (CPU) resources or server load and/or memory resources. When computer resources are scarce, such as a predicted or existing high load at a server or CPU or when the memory capacity is exceeded by the load, the latency reducing techniques may be tightened to decrease the number of speech units to be processed by the server CPU or retrieved/stored in memory. By reducing the number of speech units to be processed/stored/retrieved, a server, CPU and/or memory may dedicate fewer computer resources (such as CPU time, etc.) to each individual request, thereby allowing the server or CPU to process more requests in a shorter period of time or to free up memory for other shared applications. In another aspect, if computing resources may be available from other devices, when faced with high latency an ASR device may request additional resources from one or more other ASR devices.

As noted when performing ASR processing, there is a tradeoff between speed and accuracy. Some ASR techniques may cause processing parameters (e.g., graph pruning factors, path weights, ASR models, etc.) to be adjusted such that the speed of ASR processing is increased or decreased. For example, the processing parameters may be adjusted, to improve the accuracy of speech processing while decreasing the speed, or to increase the speed while at the same time reducing the accuracy.

In an ASR system, such as a streaming ASR system, a large amount of audio may initially be delivered at once from a local ASR device to a remote ASR device, while subsequent audio may be delivered in approximately real time. For example, when a wakeword is recognized, a computing device may send a segment of audio captured just before the wakeword (such as one or two seconds before) along with the audio of the wakeword, all at once to a remote device for ASR processing. After sending this initial audio, the local device may send all remaining audio in real time (i.e. as soon as the audio is communicated). As a result, when the remote ASR device starts speech processing, it already includes a substantial backlog of audio to process before processing the 'real time' audio.

Aspects of the disclosure seek to reduce latency between the time a spoken command is given to the computing device and the time the user sees any results. For example, the remote ASR device may be configured to return the best possible speech recognition result in a reduced time, after the user ends an utterance. To achieve this feature, an ASR system may speed through the processing of the initial audio (i.e., backlog) to 'catch up' or advance to real time processing of current audio. In this case, the remote ASR device may process the backlog of audio at an increased speed relative to the speed of processing the real time audio. For example, if the ASR device is aware that the user is speaking for a short period of time, e.g., a second or so, the ASR device may increase the speed of processing the audio significantly to a desirable speed (e.g., 0.5 real time factor (RTF)) that allows the speech processing to advance or catch up to the real time processing quickly. The increase in the processing speed may reduce the accuracy of the speech processing. Alternatively, when the ASR device is aware that a user is speaking for an extended period of time, the ASR device may adjust the speed of processing the audio more modestly (e.g., 0.9 RTF) for a period of time that will allow the speech processing to advance or catch up to real time while the audio is being processed without drastically impacting the accuracy of the speech processing.

In some instances, however, the ASR device is unaware of the duration of the audio and therefore cannot adjust the processing speed based on the duration of the audio. To account for this, the ASR device may simultaneously perform multiple independent speech processing implementations. For example, an ASR device may activate two speech recognition threads in which one of the threads is faster but less accurate and the other is slower but more accurate. The two speech recognition threads may process the audio, e.g., stream of audio, in parallel. If the user stops speaking after a short amount of time, the result of the faster (though less accurate) speech recognition thread may be used or selected for the speech processing while a result of the slower speech recognition thread is not used. However, if the user speaks for a longer time, the result of the slower (more accurate) speech recognition thread may be used for speech processing while the result of the faster speech recognition thread is not used. An estimated latency of the two threads of audio may be used to determine whether speech recognition results of the first thread or second thread are used. For example, if the first thread finishes and the second thread has a high expected latency, the speech recognition results of the first thread may be used, and the speech recognition results of the second thread may be discarded. Alternatively, if the first thread finishes and the second thread has a low expected latency, then the speech recognition results of the second thread may be used and the speech recognition results of the first thread may be discarded.

The speed of the speech recognition threads may be configured through appropriate settings of the speech processing parameters. Further, the speech processing parameters for each of the two threads may also be adjusted based on an estimated latency for each thread as described above. For example, two threads may initially be set to 0.5 and 0.9 RTF, respectively. As speech processing continues and the estimated latencies decrease, we may adjust the two threads to be set to 0.6 and 0.95 RTF, respectively.

While the techniques discussed so far focus on reducing latency within ASR processing, the ASR system may also attempt to alter downstream processing, such as other speech processing (like processing by a natural language understanding (NLU) unit), or other downstream application that may contribute to latency, to adjust their processing to reduce latency. For example, the ASR system may indicate to an NLU unit to implement latency reducing techniques within its own processing. Further, the ASR system, even if not faced with latency issues on its own, may implement latency reducing ASR techniques if it is determined that overall user-experienced latency is being caused by a non-ASR component in the computational path between a user inputting an utterance command and the user receiving the results from the command. For example, if a system determines that a NLU unit and/or downstream application is causing undesired latency (and possibly may be unable to fix the situation) the ASR unit may implement latency reducing techniques to reduce the overall latency.

Other latency reducing techniques include skipping at least some speech recognition steps, such as language model rescoring, lattice-based acoustic model rescoring, confusion network generation, N-best list generation, confidence generation, lattice determinization and minimization, or other speech recognition calculations that may be omitted to speed processing.

The latency reducing techniques discussed above may be applied dynamically and changed utterance-by-utterance during runtime, or even adjusted mid-utterance based on ongoing latency measurements. Latency may be monitored continuously, or at a high rate (for example 100 times per second) to ensure the ASR system is handling requests at a desired pace. If latency becomes too high, or a predicted latency for a specific utterance is deemed to likely be too high (for example due to conditions such as high noise, difficult to process audio, CPU unavailability, etc.), the ASR system may dynamically adopt latency reducing techniques such as those described. Further, the ASR system, using the latency management module 322, may determine to what level to implement the latency reducing techniques (e.g., at what level to reset pruning parameters, etc.) based on the latency or predicted latency. That is, more drastic measures may be taken in view of higher latency. The ASR system may also choose to implement latency reducing techniques gradually if such implementation may result in too-sudden of a quality drop such that the quality drop becomes jarring to a user.

The performance of certain latency reducing techniques, and how strongly they are applied, may be tested by an ASR system generally or under specific runtime conditions (i.e., for specific users, specific devices, specific audio environments, etc.). The techniques which work best during different runtime conditions may be replicated when those same runtime conditions are again present.

Figure 10:
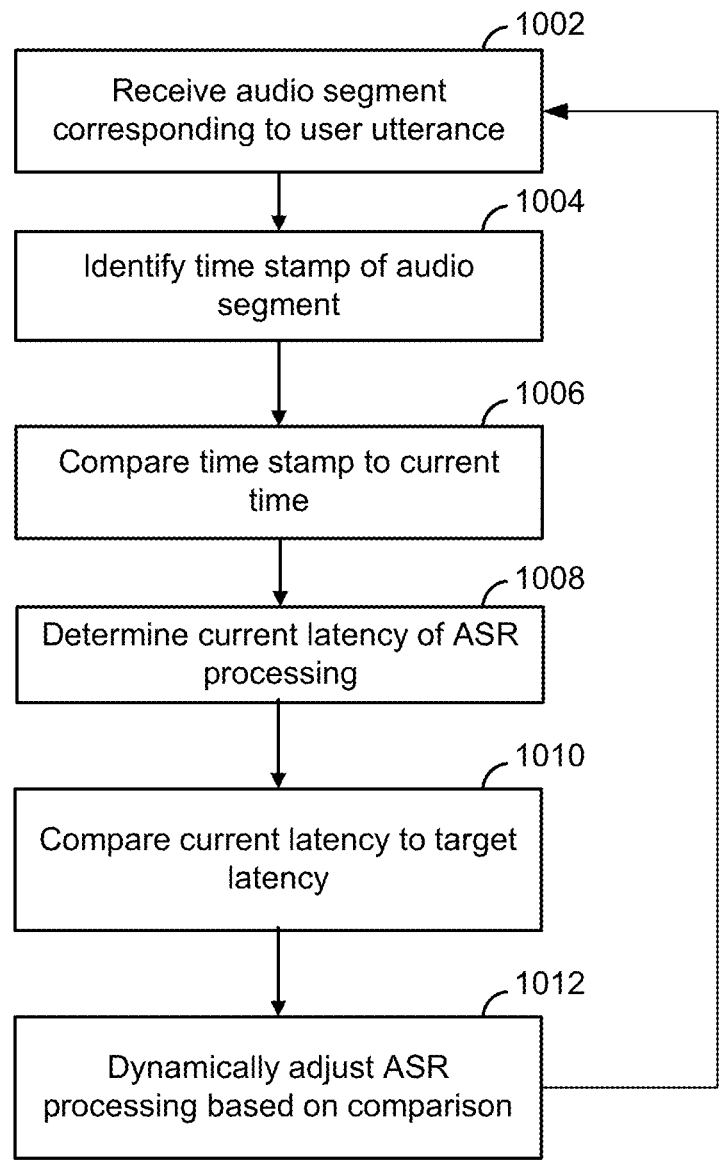
FIG. 10 illustrates a method for dynamically adjusting speech recognition features of a speech recognition system according to one aspect of the present disclosure.

FIG. 10 illustrates a method for dynamically adjusting ASR processing according to aspects of the present disclosure. The method may be implemented at a speech recognition system (e.g., speech recognition system 100). In some aspects of the disclosure, the speech recognition system may be incorporated into a remote device (e.g., a server over a network) that is coupled to a user device or may be distributed between the remote server and the user device. At block 1002, the speech recognition system may receive a voice signal corresponding to an utterance from a user. At block 1004, the speech recognition system may identify a time stamp associated with the utterance. At block 1006, the speech recognition system may compare the time stamp to a current processing time. At block 1008, based in part on the comparison and potential other factors, the system may determine a current latency of the utterance. At block 1010, the speech recognition system may use the current latency to determine an overall latency and compare that overall latency to a target latency. At block 1012, if the overall latency is above the target latency, the speech recognition system may dynamically adjust the ASR processing to reduce latency using one or more latency reducing techniques. The method may then loop back from block 1012 to block 1002 to continue to process audio segments corresponding to the user utterance.

Figure 11:
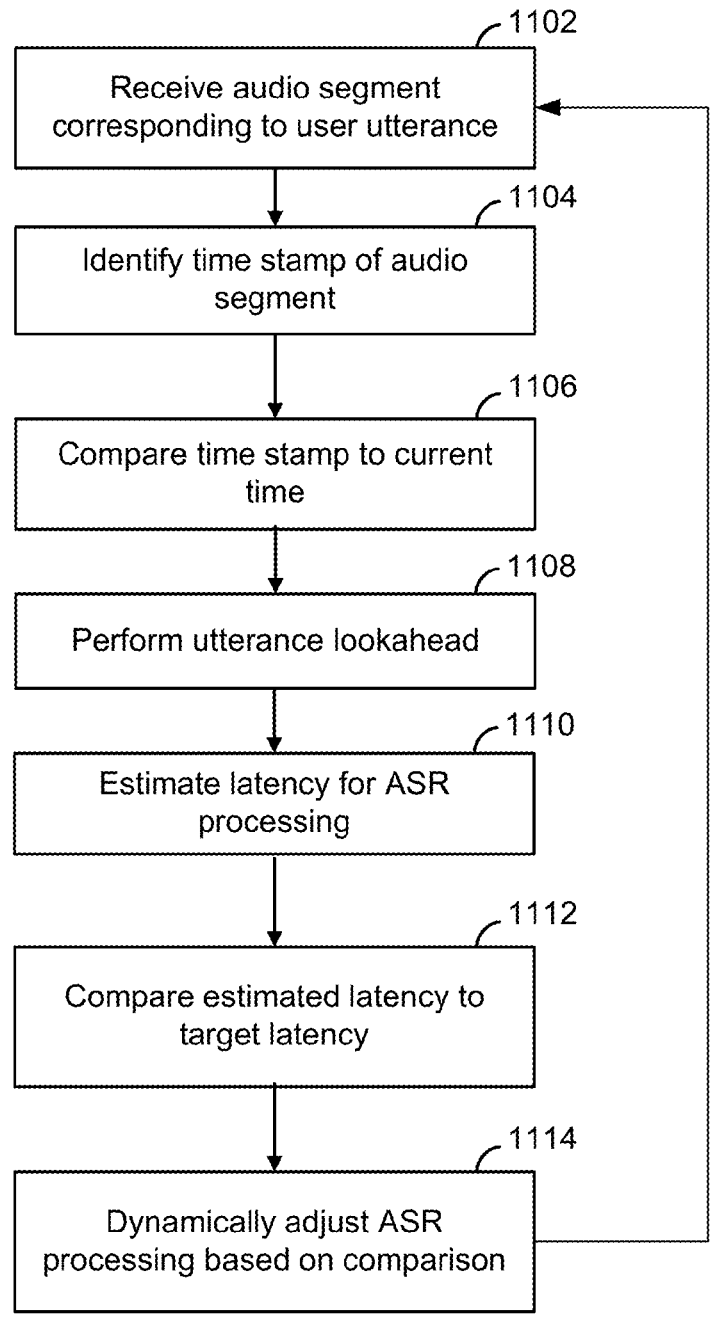
FIG. 11 illustrates another method for dynamically adjusting speech recognition features of a speech recognition system according to one aspect of the present disclosure.

FIG. 11 illustrates a method for dynamically adjusting ASR processing according to aspects of the present disclosure. The method may be implemented at a speech recognition system (e.g., speech recognition system 100). In some aspects of the disclosure, the speech recognition system may be incorporated into a remote device (e.g., a server over a network) that is coupled to a user device or may be distributed between the remote server and the user device. At block 1102, the speech recognition system may receive a voice signal corresponding to an utterance from a user. At block 1104, the speech recognition system may identify a time stamp associated with the utterance. At block 1106, the speech recognition system may compare the time stamp to a current processing time. At block 1108, the speech recognition system may perform one or more lookahead operations on the utterance to identify an endpoint, potentially difficult audio, or the like. At block 1110, the speech recognition system may estimate a latency for the remainder of the utterance, based at least in part on the lookahead. At block 1112, the speech recognition system may use the estimated latency to determine an overall latency and compare that overall latency to a target latency. At block 1114, if the overall latency is above the target latency, the speech recognition system may dynamically adjust the ASR processing to reduce latency using one or more latency reducing techniques. The method may then loop back from block 1114 to block 1102 to continue to process audio segments corresponding to the user utterance.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method for dynamically adjusting speech recognition processing to reduce latency, the method comprising:
    receiving a first portion of an audio input corresponding to an utterance;
    identifying a time stamp associated with the first portion;
    performing speech recognition processing on the first portion using a first graph pruning factor;
    identifying a current time of processing of the first portion;
    determining a current latency of the utterance by comparing the time stamp to the current time;
    determining a property of a second portion of the audio input prior to performing speech recognition processing on the second portion, the property comprising an estimated difficulty of speech recognition processing, the estimated difficulty based on a percentage of the second portion of the audio input that has a signal to noise ratio below a threshold;
    determining an estimated latency based at least in part on the property of the second portion and the current latency;
    comparing the estimated latency to a target latency;
    determining a second graph pruning factor based at least in part on the comparing;
    performing additional speech recognition processing on the second portion using the second graph pruning factor; and
    outputting speech processing results.

2. The method of claim 1, wherein the first graph pruning factor comprises at least one of a maximum number of paths of a graph to process or a threshold score for selecting paths of a graph to process.

3. The method of claim 1, wherein determining the estimated latency of the utterance is further based at least in part on an endpoint location.

4. A computing device, comprising:
   at least one processor;
   a memory device including instructions operable to be executed by the at least one processor to perform a set of actions, configuring the at least one processor:
      to receive a first portion of audio data;
      to perform, beginning at a first time and with a first frame, speech processing on the first portion using a first value of a speech processing parameter;
      to determine, at a second time, a current location, in the first portion of the audio data, of data being processed during the speech processing;
      to determine a second frame at the current location;
      to determine a first number of frames between the first frame and the second frame;
      to determine a first processing rate based at least in part on the first number of frames, the first time and the second time;
      to estimate, based on the current location and the first processing rate, a speech processing latency corresponding to processing of a second portion of the audio data;
      to set the speech processing parameter to a second value based at least in part on the speech processing latency; and
      to perform speech processing on the second portion of the audio data using the second value of the speech processing parameter.

5. The computing device of claim 4, wherein the at least one processor is further configured:
   to estimate a second estimated speech processing latency based on the speech processing on the second portion;
   to perform second speech processing on the first portion using a third value of the speech processing parameter; and
   to select speech recognition results from the speech processing or the second speech processing based at least in part on the second estimated speech processing latency of the speech processing or an estimated speech processing latency of the second speech processing.

6. The computing device of claim 4, wherein the at least one processor is further configured:
   to identify a timestamp of processing associated with a beginning of the first portion, the timestamp corresponding to the first time;
   to determine a current time of processing associated with the current location, the current time corresponding to the second time;
   to determine a difference between the timestamp and the current time; and
   to determine the first processing rate based at least in part on the first number of frames and the difference.

7. The computing device of claim 4, wherein the at least one processor is further configured:
   to determine an endpoint of the audio; and
   to estimate the speech processing latency based at least in part on the current location, the endpoint, and the first processing rate.

8. The computing device of claim 4, wherein the at least one processor is further configured to determine a property of the second portion of the audio data prior to performing speech processing on the second portion, and wherein the at least one processor is configured to estimate the speech processing latency based at least in part on the property.

9. The computing device of claim 8, wherein the property of the second portion comprises at least one of a level of noise, or an estimated difficulty of speech recognition processing.

10. The computing device of claim 4, wherein the at least one processor is configured to estimate the speech processing latency based at least in part on a load of the computing device.

11. The computing device of claim 4, wherein the speech processing parameter comprises at least one of a graph pruning factor, a weight of a graph path, a grammar size, a numerical-precision parameter, a Gaussian mixture-component-count parameter, a frame-rate parameter, a score-caching parameter, an intent-difficulty parameter, a user-class parameter, an audio-quality parameter, a server-load parameter or a number of features of an audio frame to be processed.

12. The computing device of claim 4, wherein the at least one processor is configured to set the speech processing parameter based at least in part on a speaker of the audio data.

13. The computing device of claim 4, wherein the at least one processor is further configured:
   to determine that the first processing rate is below a threshold; and
   to set the speech processing parameter to the second value because the first processed rate is below the threshold.

14. The computing device of claim 4, wherein the at least one processor is further configured:
   to perform speech processing on the first portion of the audio data from the current location using the second value of the speech processing parameter; and
   to perform speech processing on a third portion of the audio data using the first value of the speech processing parameter.

15. A non-transitory computer-readable storage medium storing processor-executable instructions for controlling a computing device, comprising:
   program code to receive a first portion of audio data;
   program code to perform speech processing on the first portion using a first value of a speech processing parameter;
   program code to determine a property of a second portion of the audio data, the property comprising an estimated difficulty of speech recognition processing, the estimated difficulty based on a percentage of the second portion of the audio data that has a signal to noise ratio below a threshold;
   program code to estimate, based at least in part on the property, a speech processing latency corresponding to processing of the audio data;
   program code to set the speech processing parameter to a second value based at least in part on the speech processing latency; and
   program code to perform speech processing on a second portion of the audio data using the second value of the speech processing parameter.

16. The non-transitory computer-readable storage medium of claim 15, further comprising:
   program code to estimate a second estimated speech processing latency based on the speech processing on the second portion;

program code to perform second speech processing on the first portion using a third value of the speech processing parameter; and program code to select speech recognition results from the speech processing or the second speech processing based at least in part on the second estimated speech processing latency of the speech processing or an estimated speech processing latency of the second speech processing.

17. The non-transitory computer-readable storage medium of claim 15, further comprising program code to identify a timestamp of the first portion and to determine a current time of processing, and wherein the program code is further configured to estimate the speech processing latency based at least in part on the timestamp, and the current time.

18. The non-transitory computer-readable storage medium of claim 17, further comprising program code to determine an endpoint of the audio data, and wherein the program code is further configured to estimate the speech processing latency based at least in part on the endpoint.

19. The non-transitory computer-readable storage medium of claim 15, wherein the program code is further configured to estimate the speech processing latency based at least in part on a load of the computing device.

20. The non-transitory computer-readable storage medium of claim 15, wherein the speech processing parameter comprises at least one of a graph pruning factor, a weight of a graph path, a grammar size, a numerical-precision parameter, a Gaussian mixture-component-count parameter, a frame-rate parameter, a score-caching parameter, an intent-difficulty parameter, a user-class parameter, an audio-quality parameter, a server-load parameter or a number of features of an audio frame to be processed.

21. The non-transitory computer-readable storage medium of claim 15, wherein the program code is further configured to set the speech processing parameter based at least in part on a speaker of the audio data.

22. The non-transitory computer-readable storage medium of claim 15, further comprising:

program code to perform speech processing on the first portion of the audio data, from a current location of data being processed during speech processing, using the second value of the speech processing parameter; and program code to perform speech processing on a third portion of the audio data using the first value of the speech processing parameter.

23. The non-transitory computer-readable storage medium of claim 15, further comprising:

program code to determine a first number of frames in the second portion of the audio data;

program code to determine a first signal to noise ratio of a first frame of the first number of frames;

program code to determine that the first signal to noise ratio is below the threshold;

program code to determine a second number of frames of the second portion of the audio data that have a signal to noise ratio below the threshold; and program code to determine the estimated difficulty of speech recognition processing based on the first number of frames and the second number of frames.

* * * * *